(12) United States Patent
DeLuca et al.

(10) Patent No.: US 11,144,987 B2
(45) Date of Patent: Oct. 12, 2021

(54) DYNAMICALLY NORMALIZING PRODUCT REVIEWS

(71) Applicant: INTERNATIONAL BUSINESS MACHINES CORPORATION, Armond, NY (US)

(72) Inventors: Lisa Seacat DeLuca, Baltimore, MD (US); Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 15/834,111

(22) Filed: Dec. 7, 2017

(65) Prior Publication Data

US 2019/0180353 A1     Jun. 13, 2019

(51) Int. Cl.
G06Q 30/06     (2012.01)
G06Q 30/02     (2012.01)

(52) U.S. Cl.
CPC ..... G06Q 30/0643 (2013.01); G06Q 30/0282 (2013.01); G06Q 30/0631 (2013.01)

(58) Field of Classification Search
CPC ........... G06Q 30/0643; G06Q 30/0282; G06Q 30/0631
USPC ....................................................... 705/27.2
See application file for complete search history.

(56) References Cited

U.S. PATENT DOCUMENTS

| | | | | |
|---|---|---|---|---|
| 5,583,763 | A * | 12/1996 | Atcheson | G06Q 30/02 707/750 |
| 6,032,129 | A * | 2/2000 | Greef | G06Q 30/06 705/26.43 |
| 7,899,875 | B1 | 3/2011 | Gall | |
| 9,607,325 | B1 | 3/2017 | Sriram | |
| 9,852,215 | B1 * | 12/2017 | Sullivan | G06F 16/36 |

(Continued)

OTHER PUBLICATIONS

Min, Hye-Jin, and Jong C. Park. "Identifying helpful reviews based on customer's mentions about experiences." Expert Systems with Applications 39.15 (2012): 11830-11838. (Year: 2012).*

(Continued)

*Primary Examiner* — Resha Desai
*Assistant Examiner* — Elisa H Yang
(74) *Attorney, Agent, or Firm* — Schmeiser, Olsen & Watts; Stephanie Carusillo

(57) ABSTRACT

A system, method and tools for normalizing product reviews and the presentation of product information viewed within a vendor's virtual storefront. Disclosed embodiments customize a user's navigation experience of a vendor's virtual storefront to be normalized to a target user's profile, social media or past information of the target user to prioritize relevant product reviews while de-prioritizing irrelevant ones. Normalization occurs through the identification of product reviews relevant to the target user's age, interests, purchasing history, activity levels, sizing, environment, location and internet activity or other distinguishing settings, features or information known. Sensor measurements from one or more TOT devices provide additional information which can be used to normalize the product reviews. Each relevant portion of a normalized product review normalized can be annotated to draw attention to the user browsing the virtual storefront and include reasons or rationale for the relevance of the product review to the target user.

11 Claims, 7 Drawing Sheets

(56) References Cited

U.S. PATENT DOCUMENTS

| | | | |
|---|---|---|---|
| 2002/0045154 A1* | 4/2002 | Wood | G06Q 30/02 434/350 |
| 2002/0161664 A1* | 10/2002 | Shaya | G06Q 30/02 705/7.31 |
| 2002/0178072 A1* | 11/2002 | Gusler | G06Q 10/10 705/26.1 |
| 2004/0117270 A1* | 6/2004 | Sugahara | G06Q 30/0625 705/26.41 |
| 2010/0145647 A1 | 6/2010 | Bouchard | |
| 2011/0202400 A1* | 8/2011 | Bedard | G06Q 30/02 705/14.19 |
| 2011/0251807 A1 | 10/2011 | Rada | |
| 2012/0005114 A1* | 1/2012 | Bank | G06Q 30/02 705/347 |
| 2013/0144802 A1* | 6/2013 | Bank | G06Q 30/02 705/347 |
| 2013/0211943 A1* | 8/2013 | Linden | G06Q 30/0601 705/26.1 |
| 2013/0275267 A1 | 10/2013 | Cvek | |
| 2013/0311395 A1 | 11/2013 | Bohra; et al. | |
| 2014/0172638 A1* | 6/2014 | El-Hmayssi | G06Q 30/0631 705/26.41 |
| 2015/0032650 A1 | 1/2015 | Mermelstein | |
| 2015/0073907 A1 | 3/2015 | Purves | |
| 2015/0242891 A1 | 8/2015 | Mimran | |
| 2015/0332353 A1 | 11/2015 | Chauhan | |
| 2016/0148297 A1 | 5/2016 | Kashyap | |
| 2016/0253738 A1 | 9/2016 | Pinckney | |
| 2016/0274611 A1 | 9/2016 | Amer | |
| 2016/0292768 A1 | 10/2016 | Needham | |
| 2016/0328483 A1 | 11/2016 | Mukherjee | |
| 2016/0335701 A1* | 11/2016 | Allen | G06Q 30/0619 |
| 2017/0251390 A1 | 8/2017 | Gold | |
| 2017/0262904 A1 | 9/2017 | O'Herlihy | |
| 2018/0012283 A1 | 1/2018 | Harve | |
| 2018/0025393 A1 | 1/2018 | Scheel | |
| 2018/0034657 A1 | 2/2018 | Brown | |
| 2018/0262046 A1 | 9/2018 | Moon | |
| 2018/0285945 A1 | 10/2018 | Gupta | |
| 2019/0347181 A1 | 11/2019 | Cranfill | |
| 2020/0400729 A1 | 12/2020 | Micali | |

OTHER PUBLICATIONS

Bilenko, Mikhail et al.; Adaptive Product Normalization: Using Online Learning for Record Linkage in Comparison Shopping; Proceedings of the 5th International Conference on Data Mining; Nov. 2005; pp. 58-65.

Leopold, George; Is the IoT Really "Internet of Sensors"?; EnterpriseTech URL: https://www.enterprisetech.com/2015/05/08/is-the-iot-really-internet-of-sensors/; May 8, 2015; 5 pages.

Logan, Beth et al.; Sensors to detect the activities of daily living; 28th Annual International Conference of the IEE Engineering Medicine and Biology Society; Aug. 30-Sep. 3, 2006; 1 page (Abstract).

Michalowicz, Michael; How to Get Countless Amazon Verified Review (and Rabid Fans!); URL: http://www.mikemichalowicz.com/how-to-get-countless-amazon-verified-reviews-and-rabid-fans/; Dec. 14, 2014; 12 pages.

Sajid, Anam et al.; Cloud-Assisted IoT-Based SCADA Systems Security: A Review of the State of the Art and Future Challenges; IEEE Access—Special Section on the Plethora of Research in Internet of Things (IoT); vol. 4, 2016; Mar. 31, 2016; pp. 1375-1384.

Yang, Che-Chang et al.; Remote monitoring and assessment of daily activities in the home environment; Journal of clinical Gerontology & Geriatrics; Jun. 3, 2012; pp. 97-104.

Friedman, Jack P.; List of IBM Patents or Patent Applications Treated as Related; Dec. 7, 2017; 1 page.

Abrahams, Alan S., et al. "An Integrated Text Analytic Framework for Product Defect Discovery." Production and Operations Management 24.6 (2015): 975-990 (Year: 2015).

Alahmad, Mahmoud A., et al. "A comparative study of three feedback devices for residential real-time energy monitoring." IEEE Transactions on Industrial Electronics 59.4 (2011): 2002-2013 (Year: 2011).

SENSE home monitoring [online], available at: <https://web.archive.org/web/20170602161450/https://sense.com/product.html>, archived on Jun. 2, 2017 (Year: 2017).

Mell, Peter et al.; "The NIST Definition of Cloud Computing;" National Institute of Standards and Technology; Special Publication 800-145; Sep. 2011; 7 pages.

* cited by examiner

US 11,144,987 B2

DYNAMICALLY NORMALIZING PRODUCT REVIEWS

TECHNICAL FIELD

The present disclosure relates generally to network enabled systems, methods and tools.

BACKGROUND

E-commerce and online accessible storefronts allow for a quick and convenient way for businesses to create, gather, store and disseminate information about the users and customers that visit e-commerce merchants, websites, applications and services. Many users and customers visit websites operated by e-commerce merchants and vendors to view or purchase products or services. The information about each user's experience through the website, application or service is often collected, organized and stored into manageable data structures, such as a customer or user profile. The stored information can be accessed or recalled at a subsequent time by the customer or the business operating the e-commerce storefront. Organization and management of a user's browsing, viewing and purchasing habits provide a great deal of information about each particular user's interests, needs and past activities in order to predict future user behavior.

In recent years, there has been an increasing trend of using electronic shopping basket applications and/or wish list applications to provide a user of a website, application or service with a mechanism that temporarily stores selected items (e.g., goods, services, and/or offers) prior to purchasing these items electronically. Typically, these applications, services and websites reside on a Web server of the merchant or shopping web page and are limited to use only on that particular web page. A user can visit the merchant's web page and/or shopping portal and temporarily store items of interest in an electronic itemized list. The electronic item list can then be reviewed or e-mailed to a third party, such as a friend or family member, so that the third party may purchase these items for the user as a gift. The electronic item list can also be a temporary storage for the user, until the user decides to make a purchase of that item at a later time.

SUMMARY

A first embodiment of the present disclosure provides a method for normalizing product reviews of a vendor's virtual storefront comprising the steps of: customizing, by a processor, the vendor's virtual storefront to settings of a user profile of a user initiating a connection to the vendor's virtual storefront; receiving, by a processor, a request by the user to normalize the vendor's virtual storefront to one or more characteristics of a target user selected by the user; querying, by the processor, a data source for a target user profile; transforming, by the processor, the vendor's virtual storefront by normalizing product reviews associated with product data based on one or more characteristics of the target user profile rather than the user profile; retrieving, by the processor, the product data as a function of the user's input as the user navigates the vendor's virtual storefront; and displaying, by the processor, product reviews normalized to the one or more characteristics of the target user profile.

A second embodiment of the present disclosure provides a computer system, comprising a processor; a memory device coupled to the processing unit; and a computer readable storage device coupled to the processor, wherein the storage device contains program code executable by the processing unit via the memory device to implement a method for normalizing product reviews of a vendor's virtual storefront comprising the steps of: customizing, by the processor, the vendor's virtual storefront to settings of a user profile of a user initiating a connection to the vendor's virtual storefront; receiving, by a processor, a request by the user to normalize the vendor's virtual storefront to one or more characteristics of a target user selected by the user; querying, by the processor, a data source for a target user profile; transforming, by the processor, the vendor's virtual storefront by normalizing product reviews associated with product data based on one or more characteristics of the target user profile rather than the user profile; retrieving, by the processor, the product data as a function of the user's input as the user navigates the vendor's virtual storefront; and displaying, by the processor, product reviews normalized to the one or more characteristics of the target user profile.

A third embodiment of the present disclosure provides a computer program product comprising: one or more computer readable hardware storage devices having computer readable program code stored therein, said program code containing instructions executable by the one or more central processing units (CPU) to implement a method for normalizing product reviews of a vendor's virtual storefront comprising the steps of: customizing, by the processor, the vendor's virtual storefront to settings of a user profile of a user initiating a connection to the vendor's virtual storefront; receiving, by a processor, a request by the user to normalize the vendor's virtual storefront to one or more characteristics of a target user selected by the user; querying, by the processor, a data source for a target user profile; transforming, by the processor, the vendor's virtual storefront by normalizing product reviews associated with product data based on one or more characteristics of the target user profile rather than the user profile; retrieving, by the processor, the product data as a function of the user's input as the user navigates the vendor's virtual storefront; and displaying, by the processor, product reviews normalized to the one or more characteristics of the target user profile.

DETAILED DESCRIPTION

Figure 1:
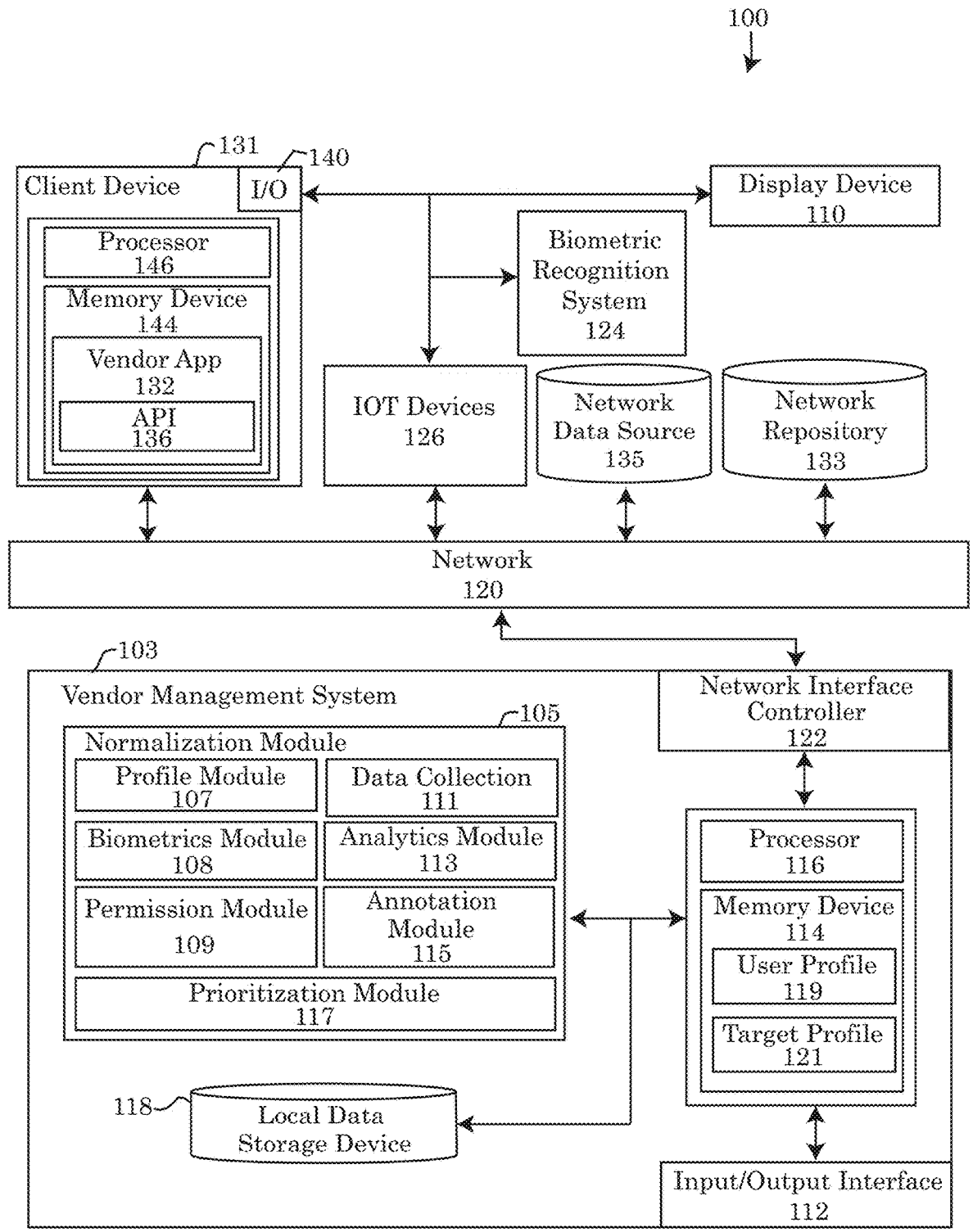
FIG. 1 depicts a block diagram of an embodiment of a system for normalizing product reviews of a vendor's virtual storefront.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Overview

Traditionally, users have come to rely on reviews of products to inform the user and allow the user to make a decision whether or not to purchase the product. Current systems for providing access to virtual vendor storefronts, such as shopping websites or application, accessible via the internet or other networks may allow for product reviews to be toggled or filtered by the current user. For example, users may sort product reviews by rating and/or the date the product review was submitted. However, there is a need for a more customized solution that allows for a user to normalize reviews to a user's preferences and characteristics and/or the preferences and characteristics of target users who the user may be shopping for.

Embodiments of the present disclosure understand the problems arising for a user accessing a vendor's virtual storefront while shopping for another person besides the user themselves. The second user or individual may be referred throughout this application as "a target user". Users browsing the virtual storefront for the target user may not be entirely aware of one or more characteristics that may be known or associated with the target user, including the target user's preferences, age, interests, purchasing history, activity levels, sizing, environment, location, internet activity, messaging service activity, sensor measurement from internet of things devices 126 (IOT Devices), etc. Embodiments of the present disclosure may customize the user's navigation experience of a vendor's virtual storefront by normalizing product reviews based on a target user's profile, social media or internet habits, prioritize product reviews relevant to the target user first and remove or de-prioritize irrelevant product reviews.

In some embodiments of the present disclosure, the disclosed systems, methods, tools and products may not only prioritize the vendor's virtual storefront by normalizing product reviews based on characteristics, preferences and known information about the target user, embodiments of the present disclosure may further annotate the product reviews that are prioritized as being the most relevant to the target user. For example, the vendor's virtual storefront may highlight or present comments denoting one or more sections of the product reviews that are more relevant to the target user's characteristics and preferences. The vendor's virtual storefront may describe one or more reasons for presenting a product review to the user and make one or more recommendations or suggestions to the user shopping for the target user, based on the annotated product review.

System for Normalizing Product Reviews

Referring to the drawings, FIG. 1 illustrates a diagram of an embodiment of a system 100 for normalizing product reviews of a vendor's virtual storefront, consistent with the disclosures of this application. Embodiments of system 100 may comprise one or more specialized computer systems referred to as a vendor management system 103, which may have a specialized configuration of hardware, software or a combination thereof as depicted in FIGS. 1-4b and as described throughout the present disclosure. Embodiments of the vendor management system 103 may comprise one or more elements of a generic computer system 600 of FIG. 6 (described in detail below). One or more of the elements of the generic computer system 600 may be integrated into the vendor management system 103 described herein or other computer systems of that may be part of system 100, for example one or more client devices 131, biometric recognition systems 124, internet of things devices 125, network data sources 135 and/or network repository 133.

Embodiments vendor management systems 103 may be a specialized computer system which may include one or more processors 116, specialized hardware or circuitry and/or software loaded in a memory device 114. The embodiments of the vendor management system 103 may perform functions, tasks and routines relating to the creation, storage or management of user profiles; identification of users interacting with the vendor management system 103; biometric identification of users; obtaining and granting permissions to users, allowing the user's to access information stored by a target user's profile 121; collecting and analyzing preferences, characteristics, viewing habits and other data stored by the target user's profile and/or network data sources 135; transmitting and displaying product data to a user; prioritizing product reviews normalized to the target user; annotating the product reviews to identify keywords or subject matter relevant to the target user's profile 121 and completing purchase transactions.

Embodiments of the vendor management system 103 may be connected and placed in communication with one or more additional computer systems, hardware or virtualized hardware, through communication over a computer network 120. Embodiments of the network 120 may be constructed using wired or wireless connections between each hardware or virtualized hardware component connected to the network 120. As shown in the exemplary embodiment of FIG. 1, the vendor management system 103 may connect to the network 120 and communicate over the network 120 with each computing system connected. Computing systems accessible via the network 120 may include one or more client devices 131, IOT devices 126, biometric recognition systems 124, network data sources 135 and network repositories 133.

Connections to the network 120 may be facilitated using a network interface controller (NIC) 122 or other network communication device. Embodiments of the NIC 122 may implement specialized electronic circuitry allowing for communication using a specific physical layer and a data link layer standard, such as Ethernet, Fiber channel, Wi-Fi or Token Ring. The NIC 122 may further allow for a full network protocol stack, enabling communication over network 120 to the vendor management system 103 client device 131, IOT devices 126, network data sources 135, network repositories 133 or other computing hardware devices linked together through communication channels. The network 120 may facilitate communication and resource sharing among the vendor management system 103, IOT devices 126, client devices 131, network data sources 135 and network repository 133 or other network accessible storage devices connected to the network 120. Examples of network 120 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

In some embodiments, the network 120 may be a cloud computing environment 50. Cloud computing is a model of service delivery enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics of the cloud computing model may be described as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms.

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The service models under a cloud computing environment 50 may be described as follows:

Software as a Service (SaaS): the capability provided to the consumer is to use the provider's applications running on a cloud infrastructure. The applications are accessible from various client devices 131 through a thin client interface such as a web browser (e.g., web-based e-mail) or a vendor's application 132 accessing services provided by a vendor management system 103 using an API 136. The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models of cloud computing environments may be described as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 2:
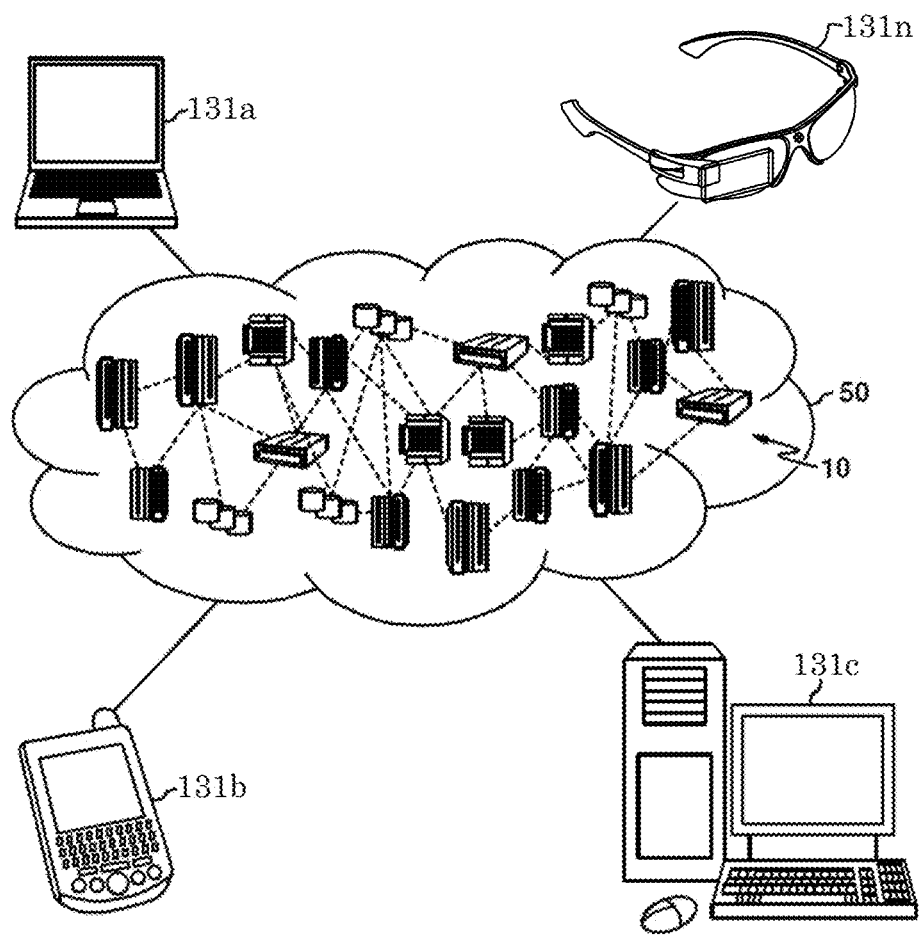
FIG. 2 illustrates a schematic view of an embodiment of a system for normalizing product reviews of a vendor's virtual storefront operating in a cloud computing environment.

A cloud computing environment 50 may be service oriented with a focus on statelessness, low coupling, modularity, and semantic interoperability. At the heart of cloud computing is an infrastructure that includes a network of interconnected nodes 10. Referring to the drawings, FIG. 2 is illustrative of a network 120 operating as a cloud computing environment 50. As shown, the cloud computing environment 50 may include one or more cloud computing nodes 10 with which client device 131*a*, 131*b*, 131*c* . . . 131*n*, such as one or more augmented (referred to collectively as "client device 131") is used by cloud consumers, such as, for example, laptop computers 103*a*, mobile communication devices 103*b*, desktop computers 103*c*, tablet computers or computer systems integrated into devices as exemplified by the smart glasses 103*n* shown in FIG. 2.

Computer system nodes 10 of the cloud computing environment 50 may communicate with one another and may be grouped physically or virtually (not shown), in one or more networks 120, such as Private, Community, Public, or Hybrid clouds as described hereinabove, or a combination thereof, allowing for the cloud computing environment 50 to offer infrastructure, platforms and/or software as services for which a cloud consumer does not need to maintain resources on each client device 131. It is understood that the types of client devices 131 shown in FIGS. 1-4*b* are intended to be illustrative only and that nodes 10 of a cloud computing environment 50 can communicate with any type of client device 131 over any type of network 120 and/or network addressable connection (e.g., using a web browser or built in application API).

Figure 3:
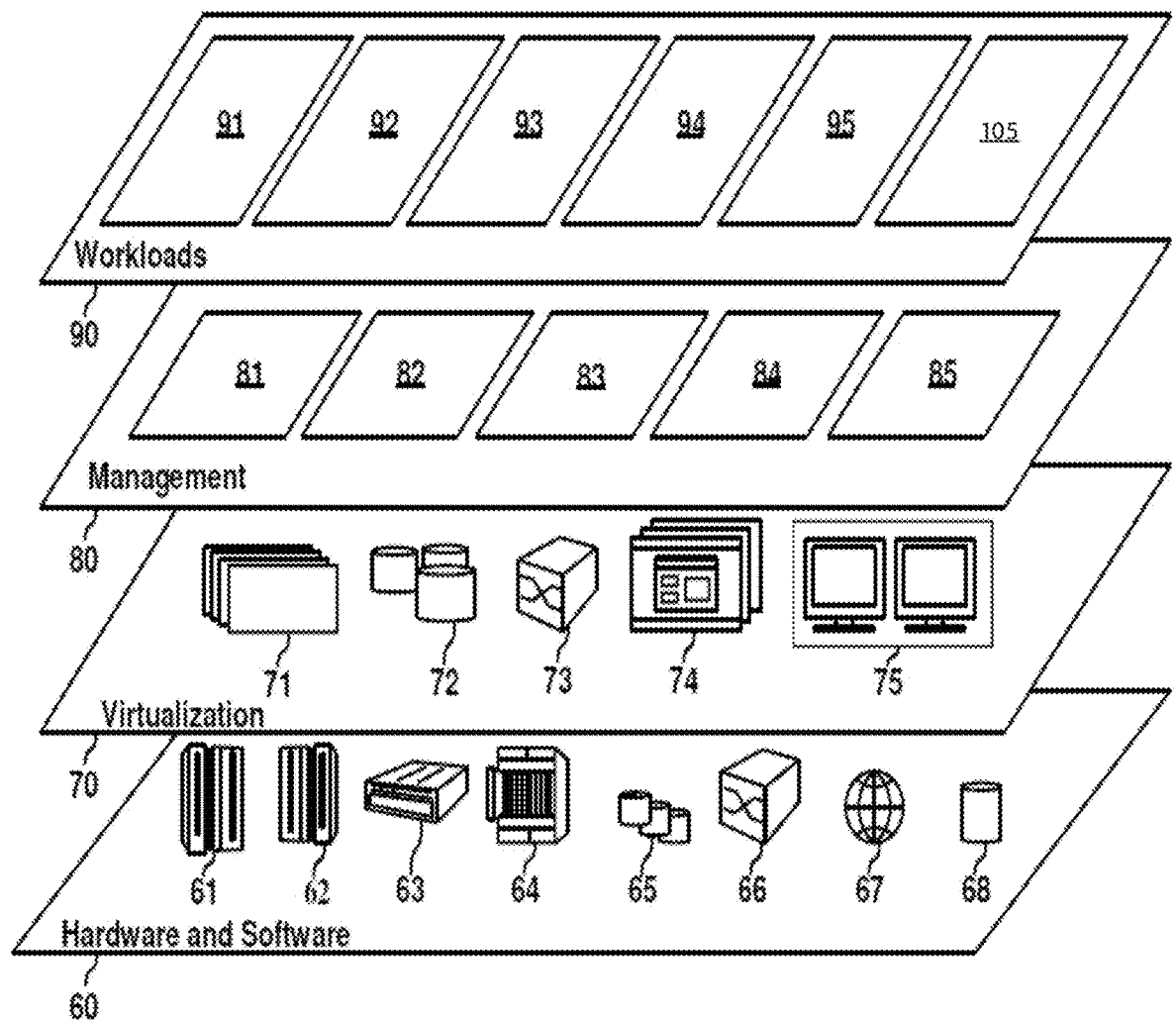
FIG. 3 illustrates a schematic view of an embodiment of the abstraction layers of a cloud computing environment.

Referring now to FIG. 3, a set of functional abstraction layers provided by a cloud computing environment 50 of the network 120 is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networking components 66. In some embodiments, software components may include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

Embodiments of the management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment of the network 120 for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: records management 91; web page management 92; searching and results management 93; data analytics processing 94; profile management 95; and normalization module 105.

Embodiments of the vendor management system 103 may include specialized hardware and/or software integrated into the vendor management system 103 performing each of the functions of the vendor management system mentioned above and throughout this application. The specialized hardware and/or software components of the vendor management system 103, implementing each function or task may be part of a normalization module 105. The hardware and/or software components of the normalization module 105 may include one or more modules or sub modules in some embodiments. Examples of these sub modules may include a profile module 107, biometrics module 108, permission module 109, data collection module 111 (described as "Data Collection 111" in FIG. 1), analytics module 113, annotation module 115 and prioritization module 117.

As used herein, the term "module" may refer to a hardware module, software-based module or a module may be a combination of hardware and software resources of a computer system and/or resources remotely accessible to the vendor management system 103 via the computer network 120. Embodiments of the modules or sub modules described in this application, whether comprising hardware, software or a combination of resources thereof, may be designed to implement or execute one or more particular functions, tasks or routines of the vendor management system 103 described herein. Embodiments of hardware-based modules may include self-contained components such as chipsets, specialized circuitry and one or more memory devices comprising a memory storage medium (described below). A software-based module may be part of a program code or linked to program code or computer code 697, 698 containing specific programmed instructions loaded into a memory device 114 of the vendor management system 103, and/or a remotely accessible memory device 114 of another network accessible computer system accessed remotely by the vendor management system 103 over the network 120. For example, in some embodiments the network accessible computer system connected to the vendor management system 103 may be a web server, application server, remote client device or other network accessible hardware.

Embodiments of the vendor management system 103 may include a normalization module 105 which may be responsible for implementing one or more of the features, tasks or functions of the vendor management system as described above and throughout this application. Embodiments of the normalization module 105 may include a profile module 107 in some instances. The profile module 107 may be responsible for performing the tasks or functions of managing each individual user profile 119 of the user accessing the vendor management system via a client device 131, Moreover, the profile manager 107 may further manage identification and access to each target user profile 121 whom may be the subject of the user's search and shopping experience while accessing the vendor management system 103.

A user accessing the vendor management system via the client device 131 may identify a particular user profile 119 belonging to the current user as well as identify one or more target user profiles 121 corresponding to each target user the current user may be shopping for. Each of the profiles 119, 121 may comprise customized settings and may contain information about the user and/or target user, including the user or target user's previous interactions with the vendor management system 103, general behavioral characteristics and identifying information about the user. For example, user profiles 119 and target user profiles 121 may comprise information relevant to search histories, purchase history, products viewed, TOT device 126 measurements, user activity levels, as well as demographic information such as the user or target user's age, size measurements and location. The profile module 107 may load the user profile 119 and target user profile 121 into the memory device 114 of the vendor management system 103. Upon loading the appropriate user profile, custom configurations, settings, product search histories and the like may be accessible to the vendor management system 103, allowing for the vendor management system 103 to normalize searches, product viewings, recommendations and product reviews to the preferences of the user profile 119 and/or target user profile.

In some embodiments of system 100, the profile module 107 may retrieve user profiles 119 and target user profiles 121 from a locally stored location, such as a local data storage device 118. In alternative embodiments, the profile module 107 may access and retrieve the user profile 119 and/or target user profile 121 from a remotely accessible storage location connected to network 120. For example, a network repository 133. By storing user profiles remotely, a single user profile 119 or target user profile may be accessed, updated and managed by multiple different vendors each having a separate vendor management system 103 or virtual storefront that may offer different products, services and shopping experiences.

Users accessing the vendor management system 103 may be granted credentials allowing the user to login into the vendor management system 103. Login credentials may be stored within each user profile 119. To access the vendor management system 103, each user may apply for access to use the vendor's virtual storefront by registering a user profile 119 with the vendor's virtual storefront. As part of the registration process, each user may provide demographic information as well as identifying information about themselves which may be stored within the user profile 119 and likewise a target user profile 121. Each time a user requests access to vendor management system 103, the user may provide the associated credentials, for instance a user id and password, swipe a key card, scan a bar code, etc.

It should be noted that a target user profile 121 may refer to a user profile 119 that has been accessed by another user that differs from the user that had created the user profile. For example, when a first user registers with a vendor, the user creates a user profile 119. When the first user logs in to the vendor's virtual storefront, the first user loads their own user profile 119. Likewise, a second user may create their own user profile 119 by registering with a vendor. However, if the second user wants to shop for the first user by normalizing the search results and product reviews to the preferences and settings of the first user, the second user may target the first user's information to customize the shopping experience by loading the first user's user profile 119 as the target user profile 121.

In some embodiments of the system 100, a user may identify themselves to the vendor management system 103 by inputting biometric measurements and matching the measurements to previously sampled biometric measurements that may be stored with the vendor management system 103. In some embodiments, the vendor management system 103 may implement the use of a biometrics module 108 to perform the task or function of collecting, managing and matching biometric measurements collected and transmitted to the vendor management system 103. Biometric measurements may be inputted and transmitted to the biometric module 108 through one or more biometric recognition systems 124 which may be connected to the client device 131 operated by the user or in some embodiments connected directly to an input/output (I/O) interface 112 of the vendor management system 103. The biometric recognition system 124 may include devices such as a biometric camera, microphone, scanning device (such as a fingerprint scanner or retina scanner) as well as appropriate biometric recognition software. Biometric measurements of a user that may be used to identify the user accessing the vendor management system 103 may include facial, retina, fingerprint and/or voice print recognition.

A user accessing the vendor management system 103 may utilize a biometric recognition system 124 to gain access to the vendor management system 103. A user may input one or more biometric measurements into a client device 131 via the biometric recognition system 123 alongside with a request to load the user's profile 119. The client device 131 may transmit the measurements to the biometric module 108. In response to the receipt of the user profile 119 request and measurements, the biometric module 108 may query one or more data storage devices 118 or network repositories 133 for a matching set of biometric data. The biometric module 108 may compare the inputted biometric measurements with the biometric measurements stored by the system 100, identify the user and perform a system call to the profile module 107 instructing the profile module to load a specific user profile 119 into the memory device 114 of the vendor management system 103.

Embodiments of the normalization module 105 may, in some embodiments, further comprise a permissions module 109. Embodiments of the permissions module 109 may perform the task or function of managing and/or controlling access a user may have to one or more target user profiles 121. For example, a target user may restrict which users may load a target user's profile 121 in some instances, while in other instances a target user may allow for any registered users of a vendor's virtual storefront to direct the profile manager 107 to load the target user's profile 121. If, a user attempting to load a target user profile 121 does not have permissions to access the target user's profile, the permission module 109 may alert the user that permission is denied, provide an error message and/or alert the target user about the unauthorized attempt to load the target user profile 121 by the user. Conversely, if a user has permissions to access the target user profile 121, the permission module 109 may grant access to the target user profile 121 and instruct the profile module 107 to load the target user profile 121, normalizing the user's shopping experience on the vendor's virtual storefront based on the customized settings, preferences, IOT sensor data, demographic information and other known information about the target user stored by the target user profile 121.

Embodiments of the normalization module 105 may collect a wide array of information about each user and target user of the vendor management system and store one or more conclusions about the user and target user's within the user profile 119 and target user profile 121. Embodiments of the normalization module 105 may comprise a data collection module 111 which may perform the task and function of collecting data relevant to each user or target user of the vendor management system 101. The data collection module may compile data about the user's and target users from data provided to the vendor management system 103 voluntarily during the creation of the user's profile 119, 121 (such as demographic information) or continuously monitor the user and target user's use of the vendor management system. For example, the user's shopping habits, wish lists, product purchases, product reviews, etc.

In some instances however, a user who is seeking to normalize product reviews to a target user may manually input characteristics and information into the data collection module 111 about the target user of interest. For example, a user seeking to normalize product reviews to one of their siblings may input information about that sibling including the sibling's age, sizing information, location or environment within which their sibling resides, activity level, past purchases or trends the sibling follows. Moreover, in some embodiments, the data collection module 111 may also automatically or manually be directed to search one or more network data sources 135 for information about a target user. Examples of network data sources 135 may include social media web sites, message boards, websites previously browsed by the target user, other vendor storefronts where a target user may have shopped previously, email services, and messaging services.

Furthermore, in some embodiments, the data collection module 111 may retrieve measurements from one or more TOT devices 126. An TOT device 126 can be any device that may be a network of physical devices, vehicles, home appliances or other items embedded with electronics, software, sensors, actuators, and network connectivity which may enable the TOT device 126 to connect and exchange data with the data collection module 111. Each TOT device 126 may be uniquely identifiable through the computer system embedded into the TOT device 126 but is still able to inter-operate within the existing internet infrastructure. TOT devices 126 owned by a target user may be targeted and identified by the vendor management system 103 and the information available via each TOT device 126 may be harvested from the TOT devices 126 in order to learn more information about the target user in an attempt to further normalize the product reviews available on the vendor's virtual storefront to the target user's preferences, lifestyle and habits. TOT devices 126, may for example, be equipped with one or more sensors monitoring the target user's activity. Based on the activity levels of the target user, one or more preferences or habits could be identified to further target specific normalized product reviews to the target user or user shopping for said target user.

In some embodiment of the normalization module 105, the normalization module 105 may further comprise an analytics module 113. The analytics module 113 may operate in conjunction with the data collection module 111 to draw conclusions about each user or target user as a function of the data collected. The analytics module 113 may determine, based on the collected data, a user or target user's age, sizing information, preferable products or brands, location, environment, activity levels, previous purchases, opinions about particular products or product categories, defining features of products and services that matter most to the user or target user, and even individual preferences such as favorite colors for example.

Using the conclusions drawn by the analytics module 113, an annotation module 115 may the perform function of annotating one or more product reviews that may be relevant to the user or target user. The annotation module 115 may search reviews for keywords and meta tags relevant to the identified preferences and demographic information of the user or target user and highlight or using other annotations to clearly identify sections of the most relevant reviews. The annotations of the product reviews by the annotation module 115 may allow for quicker sorting of the most relevant product reviews because the annotated portions may draw a reader's eye to parts of greatest interest to a target user. In some embodiments, the annotation module 115 and/or the analytics module 113 may provide a summarization of the reasons or rationale for highlighting one or more sections of each product review.

Embodiments of the normalization module 105 may further comprise a prioritization module 117. The prioritization module 117 may be responsible for performing the task or functions of reorganizing the order in which product reviews are displayed to the user's client device 131 by the vendor management system 103 when the product reviews are normalized to a particular target user. The prioritization module 117 may take into account information stored by the target user's profile 121, data collected by the data collection module 111, conclusions drawn by the analytics module 113 and the amount of annotations to relevant portions of each product review made by the annotation module 115 to sort the most relevant and least relevant product reviews tied to a particular piece of product data 401a, 401b, 401c (collectively referred to as product data 401).

Figure 4A:
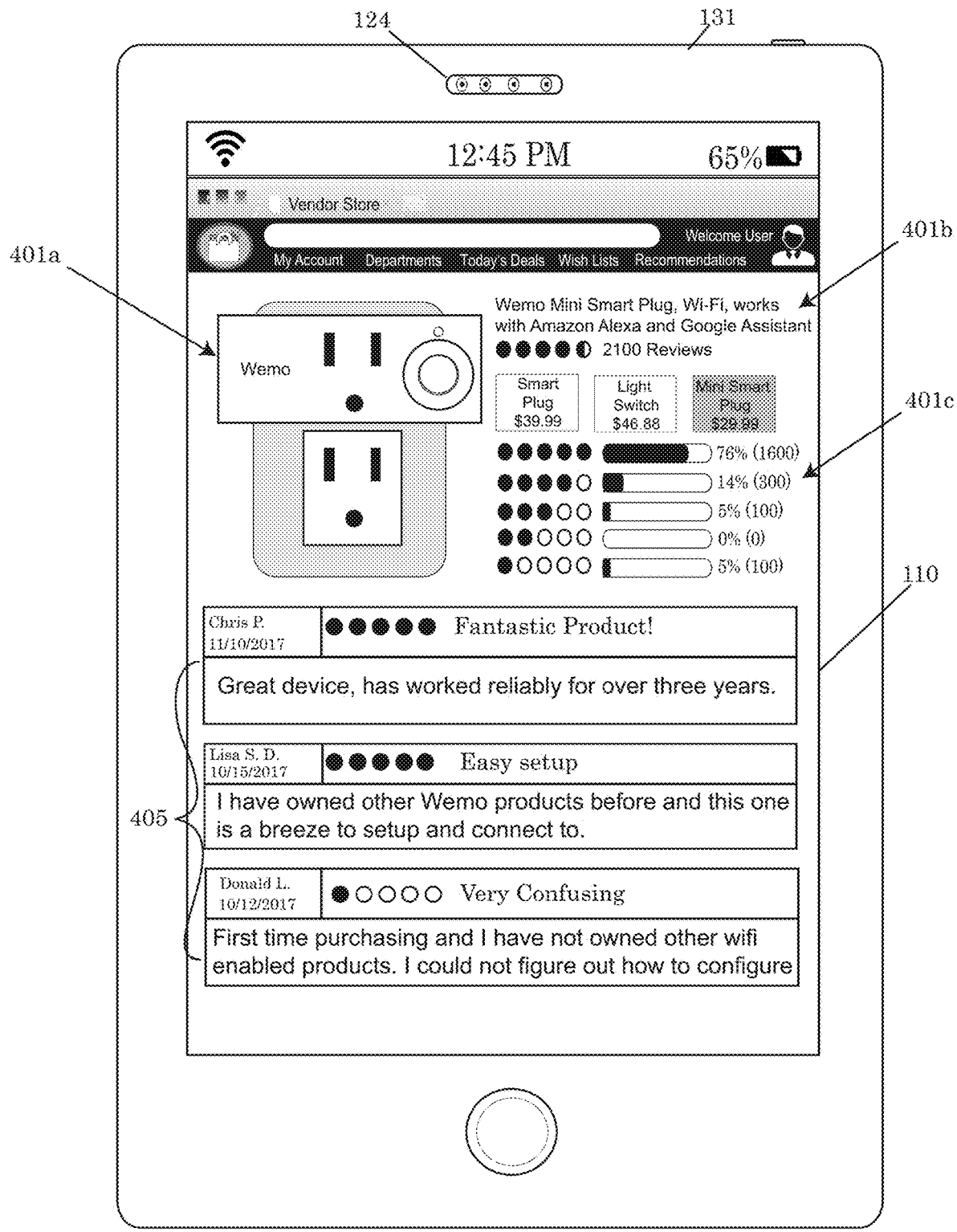
FIG. 4a depicts an embodiment of a vendor's virtual storefront presenting product data and product reviews to a user accessing the vendor's virtual storefront.
Figure 4B:
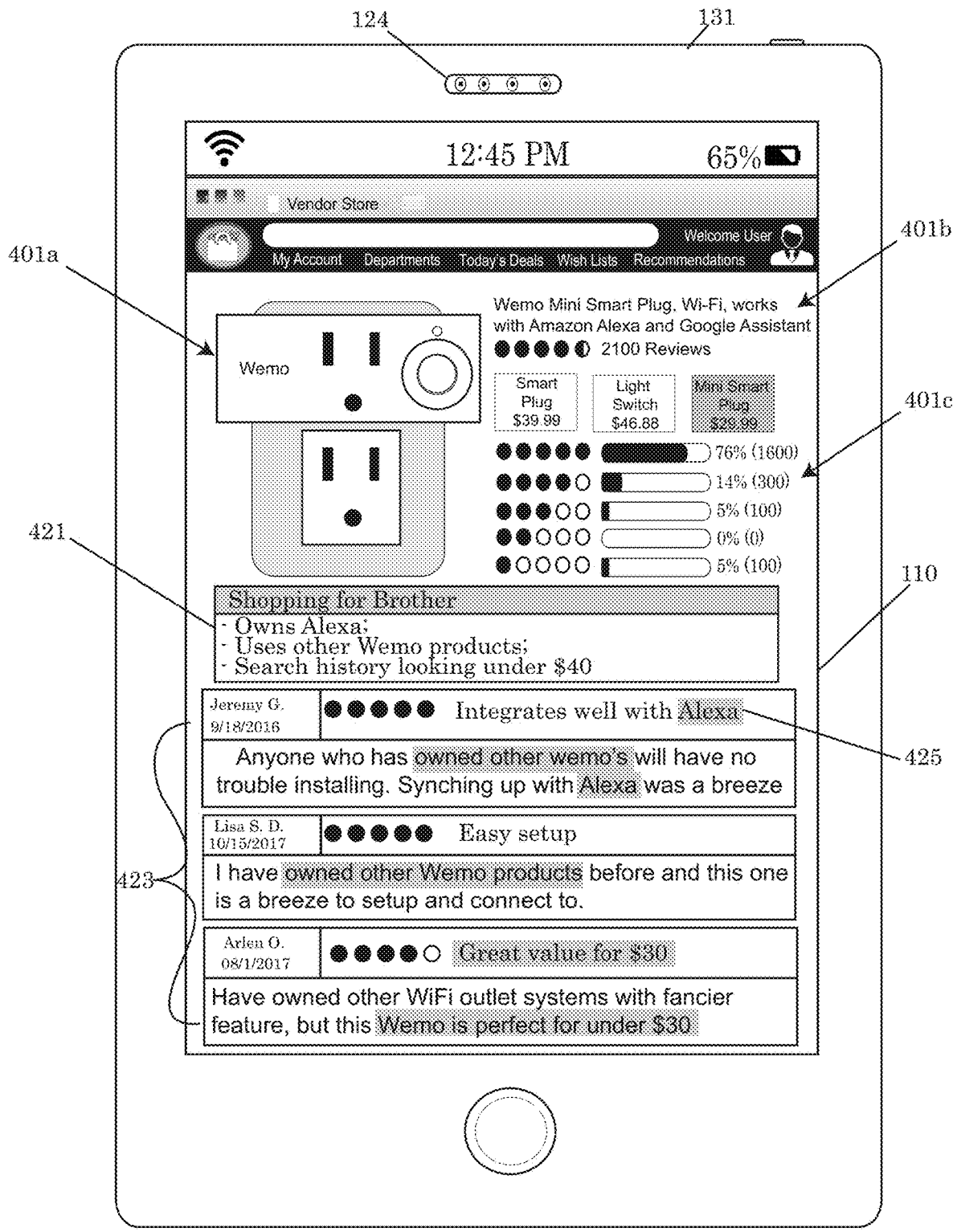
FIG. 4b depicts an embodiment of a vendor's virtual storefront presenting the same product data as FIG. 4a accessed by a user, wherein the product reviews are normalized to one or more characteristics of a target user.

Referring to the drawings, FIGS. 4a and 4b demonstrate the differences between a shopping experience on a vendor's virtual storefront when user is accessing the vendor's storefront for the user's themselves or normalizing the shopping experience to a target user. FIG. 4a depicts an example of an embodiment of a graphical user interface (GUI) of a display device 110 displaying a vendor's virtual storefront on a client device 131. As the user browses each product or service available on the vendor's storefront, the GUI may display product data 401 which may comprise an image 401a, description 401b and/or a summary 401c of one or more product reviews 405 of the product or service. As can be seen by the standard product review order in FIG. 4a, the product reviews 405 may be presented in reverse chronological order, depicting the most recent product review 405 first in some embodiments. In alternative embodiments, a user may be able to sort or filter product reviews 405 by ratings or chronological order.

Comparatively, the drawing of FIG. 4b depicts the same product data 401 shown in FIG. 4a, however the product reviews 405 have been normalized to the preferences, behavior and habits of the target user which will be referred to herein as normalized product reviews 423. In this particular example, a user who has accessed the vendor's virtual storefront has targeted the customized shopping experience to a target user which happens to be a sibling of the user. As a result of the user navigating the vendor's virtual storefront, the user may select one or more products or services of interest. As the user selects products or services, product data 401 may be displayed on the display device 110 of the user's client device 131. Along with the product data 401, the set of normalized product reviews 423 may be displayed. The normalized product reviews 423 may be organized by the prioritization module 117 into an order that is most relevant to the preferences and behaviors associated with the target user or target user profile 121. In some embodiments, each relevant normalized product review 423 may be annotated with an annotation 425 highlighting or drawing attention to one or more sections of the normalized product reviews that may be relevant to the target user or informative to the user making a purchasing decision on behalf of the target user. In some embodiments, the normalized product reviews 423 may be accompanied by a summary 421 which may describe one or more relevant features or information about the target user that may have been relevant when the prioritization module 117 considered the order of presentation for each normalized product review 423. As a user navigates from product or service to another available product or service provided by the vendor's virtual storefront, the summary 421 may dynamically adjust to describe the most relevant aspects about the target user during the normalization and annotation of the normalized product reviews 423.

Method for Normalizing Product Reviews

Figure 5:
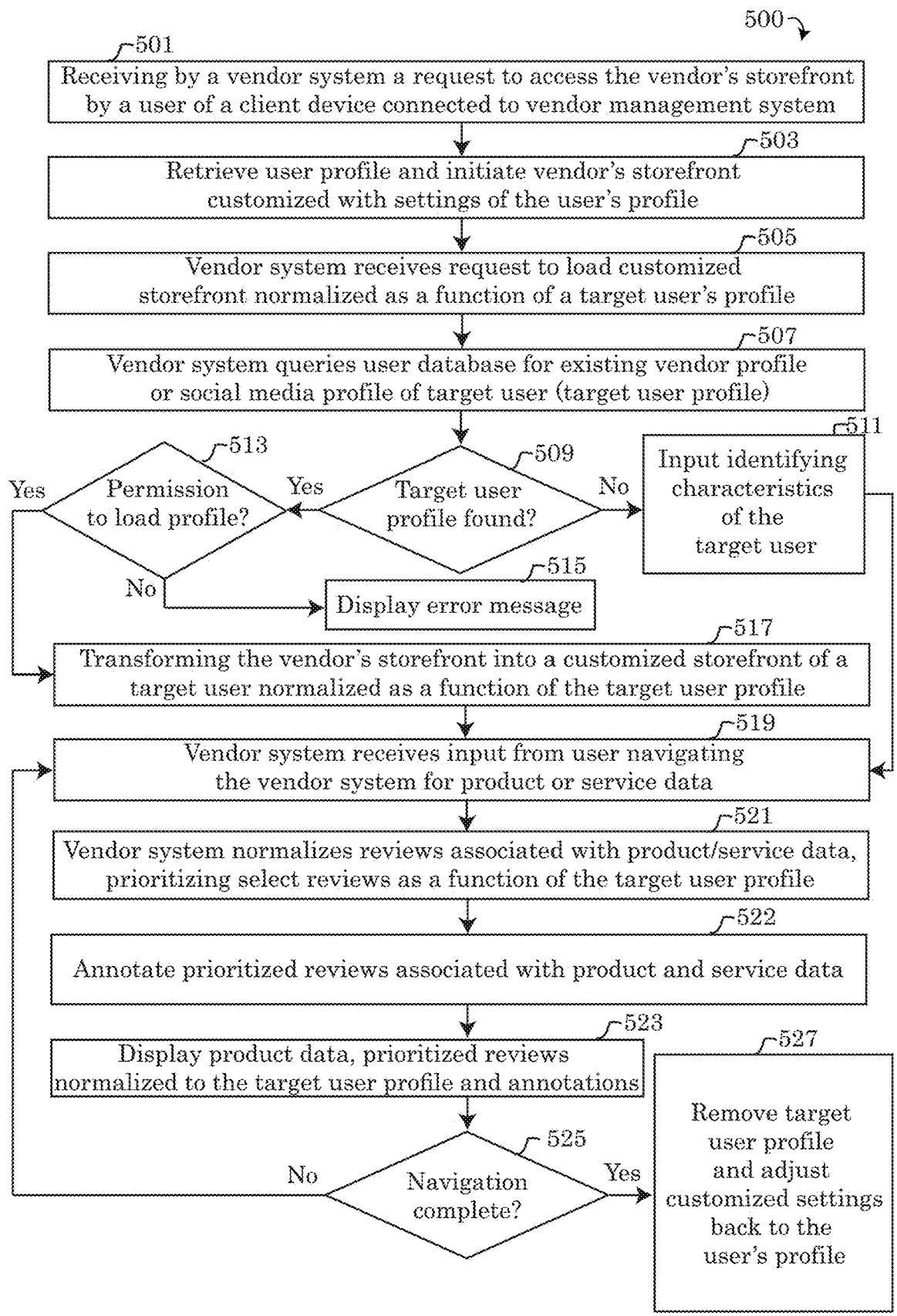
FIG. 5 depicts an embodiment of an algorithm for comparing products using augmented reality with the systems, devices, methods and tools described throughout the present disclosure.

The drawing of FIG. 5 represents an embodiment 500 of an algorithm that may be implemented for normalizing product reviews, in accordance with the systems described in FIGS. 1-4b using one or more computer systems defined generically in FIG. 6 below, and more specifically by the specific embodiments depicted in FIGS. 1-4b. A person skilled in the art should recognize that the steps of the method described in FIG. 5 may not require all of the steps disclosed herein to be performed, nor does the algorithm of FIG. 5 necessarily require that all the steps be performed in the particular order presented. Variations of the method steps presented in FIG. 5 may be performed in a different order than presented by FIG. 5.

The algorithm 500 described in FIG. 5 may describe an embodiment of an algorithm for normalizing product reviews. The algorithm 500 may initiate in step 501 by performing the step of receiving, by a vendor management system 103, a request to access the vendor's virtual storefront by a user. The request may be transmitted over a network 120 to the vendor management system 103 through the use of a client device 131 being operated by the user. As part of the access request, the user may also provide identifying credentials associated with the user's profile 119, which may already be on file with the vendor management system 103. If a user profile 119 does not exist, a user may create a new user profile which may be associated with the user's future transactions or the user may sign in as a guest if the vendor allows guests to access the vendor management system 103. A user may input login credentials during step 501 such as a username and password, biometric measurements, swipe a keycard, etc.

In step 503 of the algorithm 500, the profile module 107 of the vendor management system 103 may search and retrieve the user profile 119 associated with the login credentials inputted into the vendor management system 103 by the user. The profile module may match the login credentials to the credentials on file with the vendor management system and initiate the delivery of the vendor's virtual storefront to the client device 131. The vendor's virtual storefront loaded with the user profile 119 may be initially customized with settings and preferences saved to the user profile 119. In step 505 however, the user may transmit a request to the profile module 107 instructing the profile module 107 to load a customized virtual storefront normalized to a target user's profile 121, a set of manually inputted target user characteristics or by specifying one or more third party profiles (such as social media) maintained by a network data source 135.

In step 507 of the algorithm 500, the profile module 107 may query one or more locally stored or network accessible user databases for an existing target user profile 121 in some embodiments. In alternative embodiments, the profile module may be querying one or more social media servers, vendor servers or other network data sources 135 for a profile of a target user specified in the request of step 505. In step 509, a determination may be made by the profile module 107 whether or not the target user profile 121 has been located. If a target user profile 121 has not been found, the algorithm 500 may proceed to step 511, wherein the vendor management system 103 may permit the user to input identifying characteristics of the target user for normalizing the product reviews.

Conversely, if a target user profile 121 has been found in step 509, the profile module 107, the algorithm 500 in step 513 may call the permissions module 109 to determine whether or not the current user as permission to load the target user profile 121 into the memory device 114 of the vendor management system 103. If permission does not exist for the current user to load the target user profile 121, the algorithm 500 may proceed to step 515 wherein the vendor management system returns an error message to the client device 131 of the user. On the other hand, if permission has been granted to the user to access the target user profile 121, the target user profile 121 may be loaded into the memory device 114 of the vendor management system 103 and proceed to step 517.

In step 517 of the current algorithm 500, the vendor management system 103 may transform the user's current instance of the vendor's virtual storefront into a customized storefront that has been normalized to the target user as a function of loading the target user profile 121 comprising preferences, settings and demographic information about the target user. Subsequently in step 519, the user accessing the now customized storefront normalized to the target user, may proceed to input commands into the vendor's virtual storefront via the client device 131 and navigate the vendor's virtual storefront for available products and services. As the user selects one or more products and services while navigating the GUI of the vendor's virtual storefront, the vendor's virtual storefront may load the selected product data 401 and service data and display said data onto the display device 110 of the client device 131. During the display of the product data 401 or service data, in step 521, the prioritization module 117 of the vendor management system may normalize the product reviews 405 into normalized product reviews 423 as a function of the target user profile 121 and/or characteristics inputted into the vendor management system 103 in step 511. Each of the product reviews 405 may be rearranged and/or prioritized in accordance with the preferences, settings and relevance to the data collected and known about the target.

In some embodiments of the algorithm 500, the normalized product reviews 423 may be annotated by the annotation module 115 in step 522. One or more of the normalized product reviews 423 may include one or more annotations 425 highlighting or depicting relevant portions of the product reviews most relevant to the target user. The annotation module 115 and/or prioritization module 117 may also generate a summary 421 for each product viewed by a user experiencing the vendor's virtual storefront, wherein the summary 421 may provide reasons, rationales and keywords or phrases associated with the target user. Each of the reasons, rationales and keywords may be identified and described to the user in a manner that assists the user with understanding the reasoning for one or more normalized product reviews 423 to be prioritized over some of the other product reviews which may have been rated as a lower priority or disregarded as being irrelevant to the target user for one reason or another.

In step 523 of the algorithm 500, the vendor management system 103 may display to the display device 110 of the client device 131 the product data 401 selected by the user, the normalized reviews 423 prioritized based on the target user's profile 121, preferences, habits and characteristics as well as any annotations 425 and/or summaries 421 describing the reasons and rationale for normalizing the product reviews 425 in the order presented. The algorithm may subsequently proceed to step 525 to determine if the user has completed the navigation of the vendor' virtual storefront on behalf of the target user and/or has the user completed a transaction for purchasing one or more of the products or services viewed in step 523. If the navigation of the vendor's virtual storefront using the target user's profile 121 has not concluded and/or a final transaction (such as a purchase) has not been completed, the algorithm may proceed to step 519, wherein the user may continue to navigate the product and service offerings of the vendor's virtual storefront. Conversely, if in step 525, the navigation of the vendor's virtual storefront has been completed by the user using the target user's profile 121, the algorithm 500 may proceed to step 527, wherein the vendor management system 103 removed the target user profile 121 and readjusts the customized settings of the virtual storefront back to the settings of the user's profile 119.

Computer System

Figure 6:
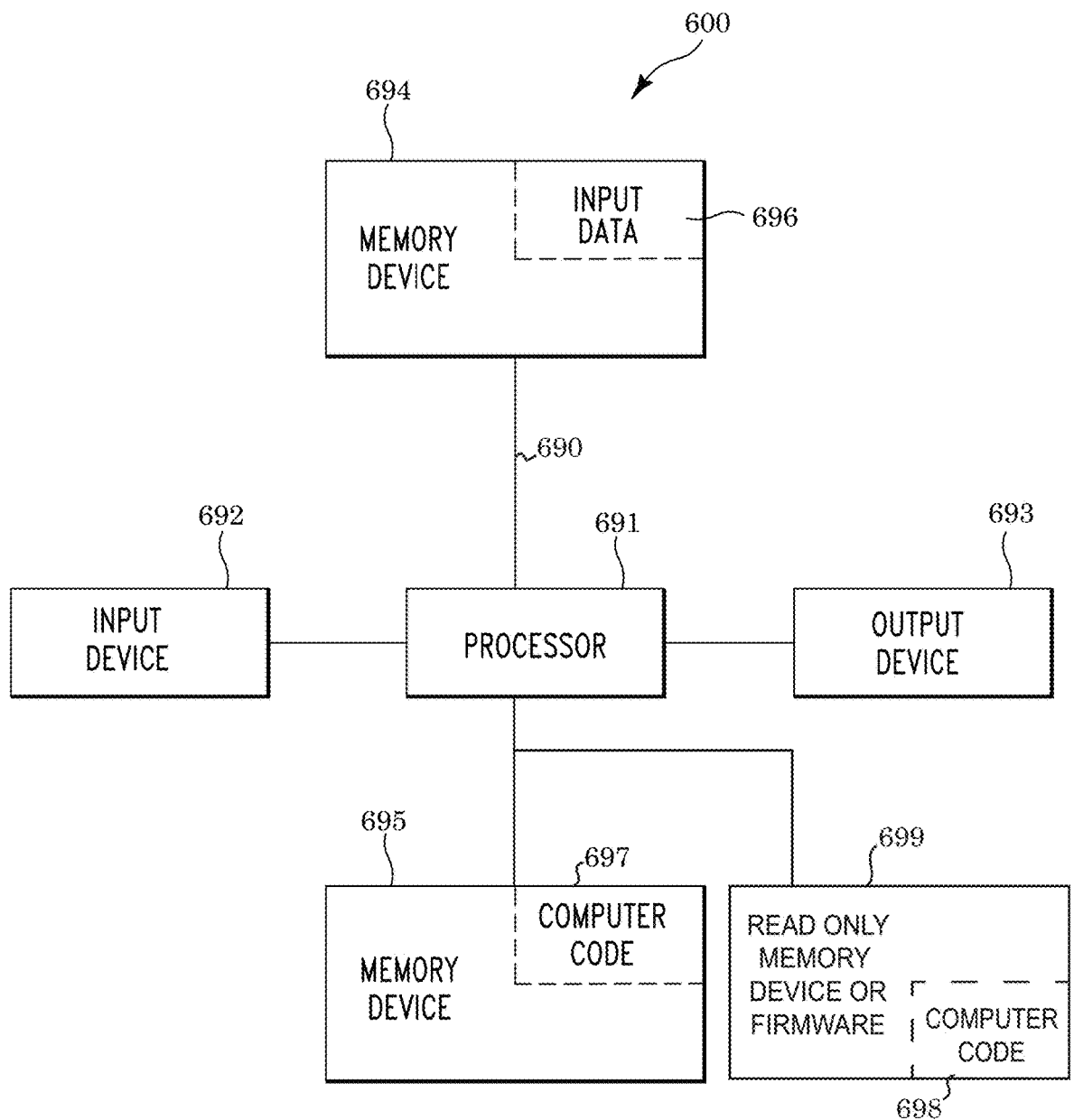
FIG. 6 depicts a block diagram of a computer system able to implement the methods for normalizing product reviews of a vendor's virtual storefront, consistent with the disclosure of the present application.

Referring to the drawings, FIG. 6 illustrates a block diagram of a computer system 600 that may be integrated into the systems of FIGS. 1-4*b* and for implementing methods for normalizing product reviews of a vendor's virtual storefront as described in FIG. 5 and in accordance with the embodiments described in the present disclosure. The computer system 600 may generally comprise a processor 691, otherwise referred to as a central processing unit (CPU), an input device 692 coupled to the processor 691, an output device 693 coupled to the processor 691, and memory devices 694 and 695 each coupled to the processor 691. The input device 692, output device 693 and memory devices 694, 695 may each be coupled to the processor 691 via a bus 690. Processor 691 may perform computations and control the functions of computer 600, including executing instructions included in the computer code 697, 698 for tools and programs for normalizing product reviews of a vendor's virtual storefront, in the manner prescribed by the embodiments of the disclosure using the systems of FIGS. 1-4*b*, wherein the instructions of the computer code 697 may be executed by processor 691 via memory device 695. The computer code 697 may include software or program instructions that may implement one or more algorithms for normalizing product reviews of a vendor's virtual storefront, as described in detail above. The processor 691 executes the computer code 697. Processor 691 may include a single processing unit, or may be distributed across one or more processing units in one or more locations (e.g., on a client and server).

The memory device 694 may include input data 696. The input data 696 includes any inputs required by the computer code 697, 698. The output device 693 displays output from the computer code 697, 698. Either or both memory devices 694 and 695 may be used as a computer usable storage medium (or program storage device) having a computer readable program embodied therein and/or having other data stored therein, wherein the computer readable program comprises the computer code 697, 698. Generally, a computer program product (or, alternatively, an article of manufacture) of the computer system 600 may comprise said computer usable storage medium (or said program storage device).

Memory devices 694, 695 include any known computer readable storage medium, including those described in detail below. In one embodiment, cache memory elements of memory devices 694, 695 may provide temporary storage of at least some program code (e.g., computer code 697, 698) in order to reduce the number of times code must be retrieved from bulk storage while instructions of the computer code 697, 698 are executed. Moreover, similar to processor 691, memory devices 694, 695 may reside at a single physical location, including one or more types of data storage, or be distributed across a plurality of physical systems in various forms. Memory devices 694, 695 can include data distributed across, for example, a local area network (LAN) or a wide area network (WAN). Further, memory devices 694, 695 may include an operating system (not shown) and may include other systems not shown in the figures.

In some embodiments, rather than being stored and accessed from a hard drive, optical disc or other writeable, rewriteable, or removable hardware memory device 694, 695, stored computer program code 698 (e.g., including algorithms) may be stored on a static, non-removable, read-only storage medium such as a Read-Only Memory (ROM) device 699, or may be accessed by processor 691 directly from such a static, non-removable, read-only medium 699. Similarly, in some embodiments, stored computer program code 697 may be stored as computer-readable firmware 699, or may be accessed by processor 691 directly from such firmware 699, rather than from a more dynamic or removable hardware data-storage device 695, such as a hard drive or optical disc.

In some embodiments, the computer system 600 may further be coupled to an Input/output (I/O) interface 112, 140 and a computer data storage unit (for example a data store, data mart or repository). An I/O interface 112, 140 may include any system for exchanging information to or from an input device 692 or output device 693. The input device 692 may be, inter alia, a keyboard, joystick, trackball, touchpad, mouse, sensors such as those found in one or more IOT devices, beacons, RFID tags, audio recording systems including one or more microphones, biometric recognition system 124 comprising a camera system, microphone, fingerprint sensor and/or facial/object recognition software. The output device 693 may be, inter alia, a printer, a plotter, a display device 110 (such as a computer screen, monitor or device capable of projecting an image thereon), a magnetic tape, a removable hard disk, a floppy disk, etc. The memory devices 694 and 695 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus 698 may provide a communication link between each of the components in computer 600, and may include any type of transmission link, including electrical, optical, wireless, etc.

The I/O interface 112, 140 may allow the computer system 600 to store information (e.g., data or program instructions such as program code 697, 698) on and retrieve the information from a computer data storage unit (not shown in FIG. 6). Computer data storage units include any known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider able to deploy or integrate computing infrastructure with respect to normalizing product reviews of a vendor's virtual storefront. Thus, an embodiment of the present invention discloses a process for supporting computer infrastructure, where the process includes providing at least one support service for at least one of integrating, hosting, maintaining and deploying computer-readable code (e.g., program code 697, 698) in a computer system (e.g., computer 600) including one or more processor(s) 691, wherein the processor(s) carry out instructions contained in the computer code 697 causing the computer system to normalize product reviews of a vendor's virtual storefront. Another embodiment discloses a process for supporting computer infrastructure, where the process includes integrating computer-readable program code into a computer system including a processor.

The step of integrating includes storing the program code 697, 698 in a computer-readable storage device of the computer system through use of the processor. The program code 697, 698, upon being executed by the processor, implements a method for normalizing product reviews of a vendor's virtual storefront. Thus the present invention discloses a process for supporting, deploying and/or integrating computer infrastructure, integrating, hosting, maintaining, and deploying computer-readable code into the computer system 600, wherein the code in combination with the computer system 600 is capable of performing a method of normalizing product reviews of a vendor's virtual storefront.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user 301's computer, partly on the user 301's computer, as a stand-alone software package, partly on the user 301's computer and partly on a remote computer or entirely on the remote computer or server. In the latter scenario, the remote computer may be connected to the user 301's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for normalizing product reviews of a vendor's virtual storefront comprising steps of:
   customizing, by a processor, a virtual storefront of a vendor to settings of a user profile of a user initiating a connection to the virtual storefront of the vendor;
   based on the customized virtual storefront, displaying, by the processor and in a graphical user interface (GUI) of a display device, first product reviews associated with first product data, the first product reviews being based on first one or more characteristics included in the settings of the user profile of the user;
   receiving, by the processor, a request by the user to normalize the virtual storefront of the vendor to second one or more characteristics of a target user selected by the user, the second one or more characteristics of the target user being different from the first one or more characteristics of the user, and the target user being a person for whom the user is shopping to purchase a product;
   in response to the receiving the request, querying, by the processor, a data source for a profile of the target user;
   transforming, by the processor, the virtual storefront of the vendor by normalizing second product reviews associated with second product data, the second product reviews being based on second one or more characteristics included in the profile of the target user so that the transformed virtual storefront is customized to the second one or more characteristics included in the profile of the target user and no longer customized to the settings of the user profile of the user;
   annotating, by the processor, portions of the normalized second product reviews by highlighting keywords that are (i) included in the second product reviews and (ii) a basis for a purchase by the user of the product for the target user;
   prioritizing, by the processor, the normalized second product reviews in an order based on amounts of the highlighted keywords included in the second product reviews;
   displaying, by the processor and in the GUI of the display device, the normalized second product reviews associated with the second product data and based on the second one or more characteristics of the profile of the target user, the normalized second product reviews being displayed instead of the first product reviews and in the order based on the amounts of the highlighted keywords, and the highlighted keywords being included in the displayed normalized second product reviews;
   using the transformed virtual storefront and based on the displayed normalized second product reviews, completing, by the processor, a purchase of the product by the user for the target user; and
   in response to the completing the purchase of the product by the user for the target user, re-customizing, by the processor, the virtual storefront to the settings of the user profile of the user so that the re-customized virtual storefront is no longer transformed to be customized to the second one or more characteristics of the profile of the target user.

2. The method of claim 1, wherein the second one or more characteristics included in the profile of the target user include an age of the target user, size measurements of the target user, an environment of the target user, an activity level of the target user, sensor measurements of internet-of-things (IOT) devices owned by the target user, a purchase history of the target user, and internet activity of the target user.

3. The method of claim 1, wherein the data source queried by the processor is a social media website, an e-commerce website, or a social media application.

4. The method of claim 1, further comprising providing at least one support service for at least one of creating, integrating, hosting, maintaining, and deploying computer-readable program code in a computer system, where the computer-readable program code in combination with the computer system is configured to implement the steps of customizing the virtual storefront, displaying the first product reviews, receiving the request to normalize the virtual storefront, querying the data source, transforming the virtual storefront, annotating the portions of the normalized second product reviews, prioritizing the normalized second product reviews, displaying the normalized product reviews, completing the purchase, and re-customizing the virtual storefront.

5. The method of claim 1, further comprising steps of:
   generating, by the processor, a summary that includes reasons that are a basis for first one or more product reviews to be prioritized over second one or more product reviews by the step of prioritizing the normalized second product reviews, the first one or more product reviews and the second one or more product reviews being included in the normalized second product reviews; and displaying, by the processor, the summary to accompany the displayed normalized second product reviews.

6. A computer system, comprising:
a processor;
a display device;
a memory device coupled to the processor; and
one or more computer readable storage media coupled to the processor, wherein the one or more computer readable storage media contains program code executable by the processor via the memory device to implement a method for normalizing product reviews of a vendor's virtual storefront comprising steps of:
customizing, by the processor, a virtual storefront of a vendor to settings of a user profile of a user initiating a connection to the virtual storefront of the vendor;
based on the customized virtual storefront, displaying, by the processor and in a graphical user interface (GUI) of the display device, first product reviews associated with first product data, the first product reviews being based on first one or more characteristics included in the settings of the user profile of the user;
receiving, by the processor, a request by the user to normalize the virtual storefront of the vendor to second one or more characteristics of a target user selected by the user, the second one or more characteristics of the target user being different from the first one or more characteristics of the user, and the target user being a person for whom the user is shopping to purchase a product;
in response to the receiving the request, querying, by the processor, a data source for a profile of the target user;
transforming, by the processor, the virtual storefront of the vendor by normalizing second product reviews associated with second product data, the second product reviews being based on second one or more characteristics included in the profile of the target user so that the transformed virtual storefront is customized to the second one or more characteristics included in the profile of the target user and no longer customized to the settings of the user profile of the user;
annotating, by the processor, portions of the normalized second product reviews by highlighting keywords that are (i) included in the second product reviews and (ii) a basis for a purchase by the user of the product for the target user;
prioritizing, by the processor, the normalized second product reviews in an order based on amounts of the highlighted keywords included in the second product reviews;
displaying, by the processor and in the GUI of the display device, the normalized second product reviews associated with the second product data and based on the second one or more characteristics of the profile of the target user, the normalized second product reviews being displayed instead of the first product reviews and in the order based on the amounts of the highlighted keywords, and the highlighted keywords being included in the displayed normalized second product reviews;
using the transformed virtual storefront and based on the displayed normalized second product reviews, completing, by the processor, a purchase of the product by the user for the target user; and in response to the completing the purchase of the product by the user for the target user, re-customizing, by the processor, the virtual storefront to the settings of the user profile of the user so that the re-customized virtual storefront is no longer transformed to be customized to the second one or more characteristics of the profile of the target user.

7. The computer system of claim 6, wherein the second one or more characteristics included in the profile of the target user include an age of the target user, size measurements of the target user, an environment of the target user, an activity level of the target user, sensor measurements of internet-of-things (IOT) devices owned by the target user, a purchase history of the target user, and internet activity of the target user.

8. The computer system of claim 6, wherein the method further comprises steps of:
generating, by the processor, a summary that includes reasons that are a basis for first one or more product reviews to be prioritized over second one or more product reviews by the step of prioritizing the normalized second product reviews, the first one or more product reviews and the second one or more product reviews being included in the normalized second product reviews; and
displaying, by the processor, the summary to accompany the displayed normalized second product reviews.

9. A computer program product comprising:
one or more computer readable storage media having computer readable program code stored on the one or more computer readable storage media, said computer readable program code containing instructions executable by one or more processors of a computer system implementing a method for normalizing product reviews of a vendor's virtual storefront comprising steps of:
customizing, by the one or more processors, a virtual storefront of a vendor to settings of a user profile of a user initiating a connection to the virtual storefront of the vendor;
based on the customized virtual storefront, displaying, by the one or more processors and in a graphical user interface (GUI) of the display device, first product reviews associated with first product data, the first product reviews being based on first one or more characteristics included in the settings of the user profile of the user;
receiving, by the one or more processors, a request by the user to normalize the virtual storefront of the vendor to second one or more characteristics of a target user selected by the user, the second one or more characteristics of the target user being different from the first one or more characteristics of the user, and the target user being a person for whom the user is shopping to purchase a product;
in response to the receiving the request, querying, by the one or more processors, a data source for a profile of the target user;
transforming, by the one or more processors, the virtual storefront of the vendor by normalizing second product reviews associated with second product data, the second product reviews being based on second one or more characteristics included in the profile of the target user so that the transformed virtual storefront is customized to the second one or more characteristics included in the profile of the target user and no longer customized to the settings of the user profile of the user;

annotating, by the one or more processors, portions of the normalized second product reviews by highlighting keywords that are (i) included in the second product reviews and (ii) a basis for a purchase by the user of the product for the target user;

prioritizing, by the one or more processors, the annotated normalized second product reviews in an order based on amounts of the highlighted keywords included in the second product reviews;

displaying, by the one or more processors and in the GUI of the display device, the normalized second product reviews associated with the second product data and based on the second one or more characteristics of the profile of the target user, the normalized second product reviews being displayed instead of the first product reviews and in the order based on the amounts of the highlighted keywords, and the highlighted keywords being included in the displayed normalized second product reviews;

using the transformed virtual storefront and based on the displayed normalized second product reviews, completing, by the one or more processors, a purchase of the product by the user for the target user; and in response to the completing the purchase of the product by the user for the target user, re-customizing, by the one or more processors, the virtual storefront to the settings of the user profile of the user so that the re-customized virtual storefront is no longer transformed to be customized to the second one or more characteristics of the profile of the target user.

10. The computer program product of claim 9, wherein the second one or more characteristics included in the profile of the target user include an age of the target user, size measurements of the target user, an environment of the target user, an activity level of the target user, sensor measurements of internet-of-things (IOT) devices owned by the target user, a purchase history of the target user, and internet activity of the target user.

11. The computer program product of claim 9, wherein the method further comprises steps of:
generating, by the processor, a summary that includes reasons that are a basis for first one or more product reviews to be prioritized over second one or more product reviews by the step of prioritizing the normalized second product reviews, the first one or more product reviews and the second one or more product reviews being included in the normalized second product reviews; and displaying, by the processor, the summary to accompany the displayed normalized second product reviews.

* * * * *